United States Patent [19]

Moran

[11] 4,380,872
[45] Apr. 26, 1983

[54] PIPE FITTER'S COMBINATION INSTRUMENT

[76] Inventor: Claude D. Moran, R.D. #1, Butler, Pa. 16001

[21] Appl. No.: 212,131

[22] Filed: Dec. 9, 1980

[51] Int. Cl.³ .............................................. G01B 3/38
[52] U.S. Cl. ................................ 33/174 N; 33/180 R; 33/427
[58] Field of Search ............ 33/174 N, 180 R, 143 M, 33/143 J, 427, 428, 429, 174 Q

[56] References Cited

U.S. PATENT DOCUMENTS

| 738,422 | 9/1903 | Duffy | 33/143 M |
| 778,808 | 12/1904 | Starrett | 33/427 |
| 1,153,785 | 9/1915 | Helin | 33/143 M |
| 2,749,622 | 6/1956 | Rasco | 33/180 R |

FOREIGN PATENT DOCUMENTS

| 509795 | 1/1955 | Italy | 33/143 M |
| 52719 | 6/1933 | Norway | 33/143 M |
| 249405 | 4/1948 | Switzerland | 33/143 M |

Primary Examiner—Willis Little

[57] ABSTRACT

An adjustable instrument, capable of several functions, is provided for use by a pipe fitter. The primary use of the instrument is for positioning pipe sections and pipe fittings for joining, and it may also be employed to locate certain points on the exterior surface of a pipe length or fitting in preparation for a joining operation. The instrument is intended particularly for onsite use in accurately positioning tubular pipes and connections which are joined by application of annular weld beads. The instrument comprises a rigid squaring tool having a slidable carriage means movable on its major bar portion, and a rigid adjustable leg projecting from the carriage means in parallel relation to the fix leg of the squaring tool. The carriage means is provided with a releasable locking means to permit selective readjustment of its position along the major bar portion on which it is mounted. The carriage means also includes a spacer block section adapted to project outwardly a specific minimum distance from an edge of the major bar portion. Both the adjustable leg and the squaring tool are provided with calibrated scale graduations enabling rapid adjustment of the instrument during use. One embodiment of the instrument includes leveling means and magnetic means carried on the carriage means to further increase the versatility of the instrument.

17 Claims, 15 Drawing Figures

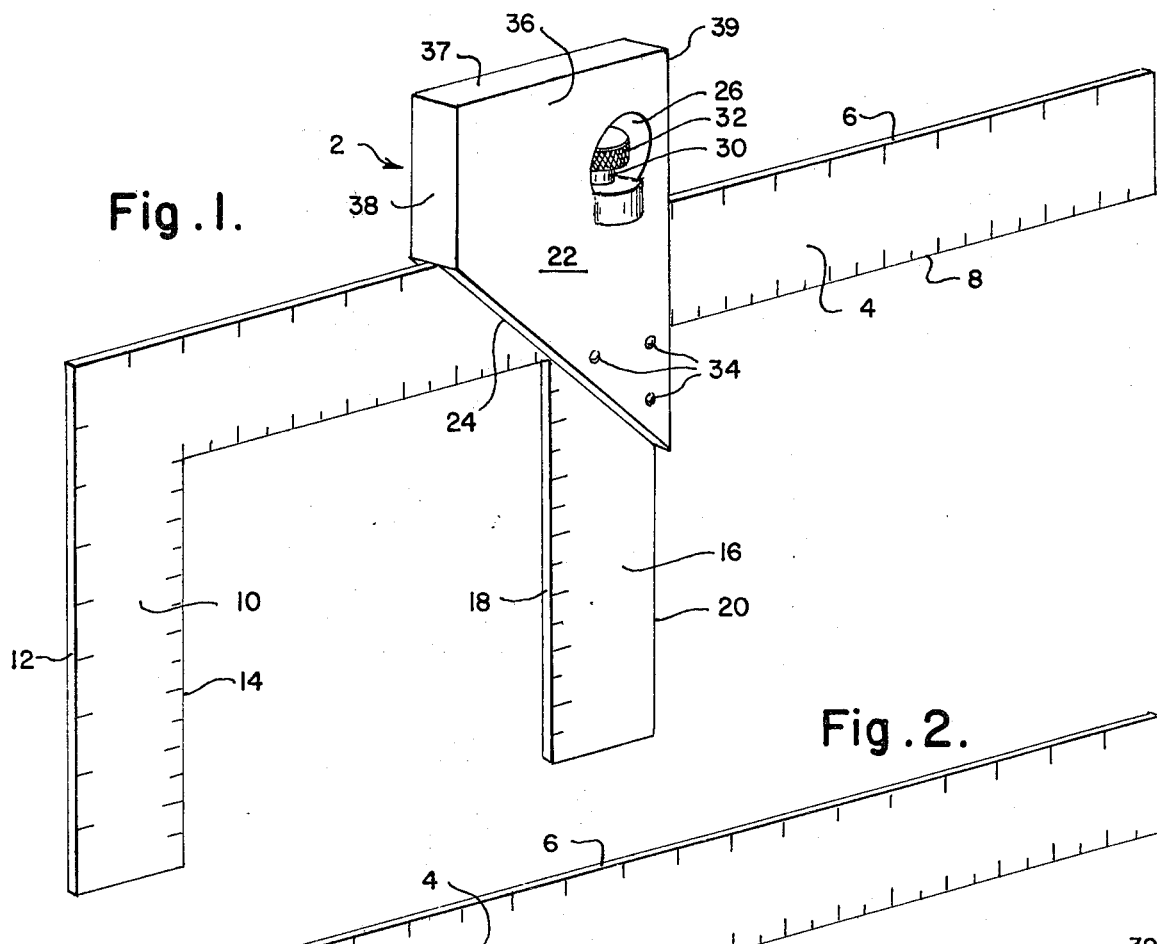
Fig. 1.
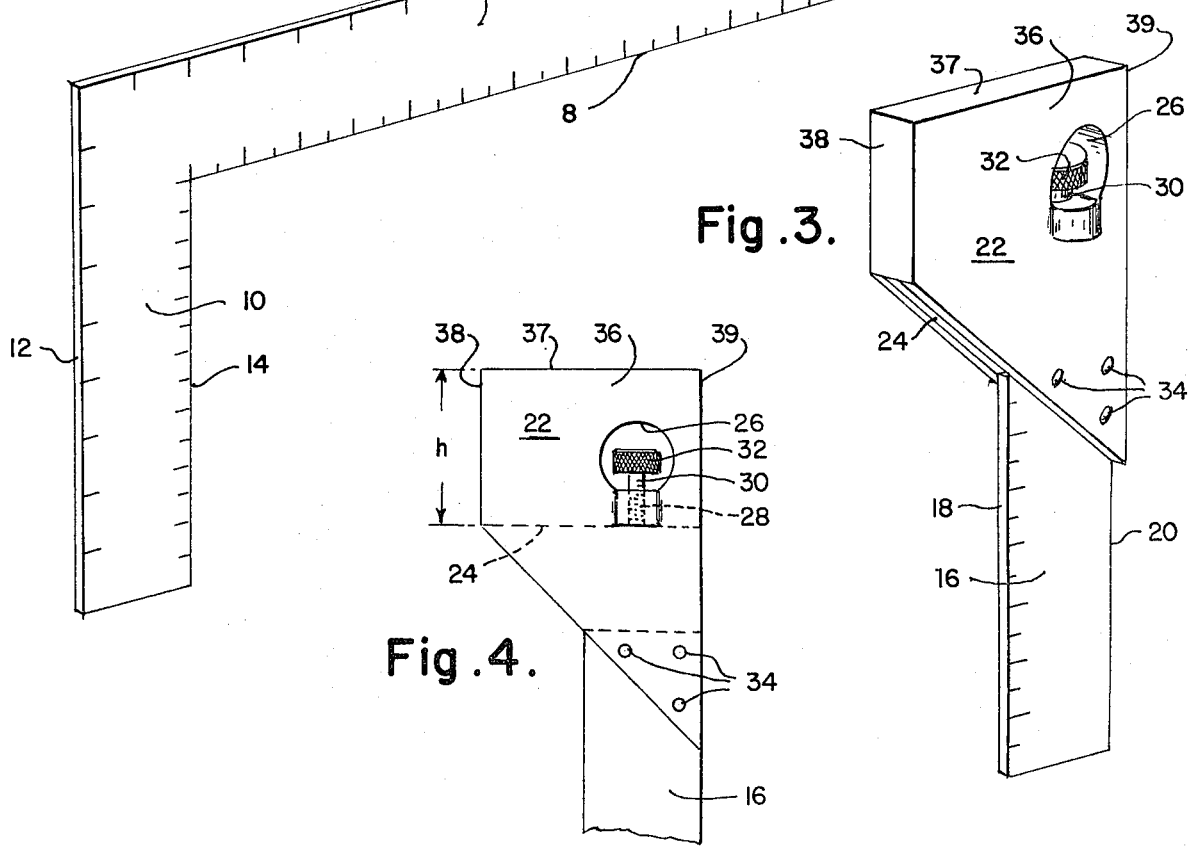
Fig. 2.
Fig. 3.
Fig. 4.

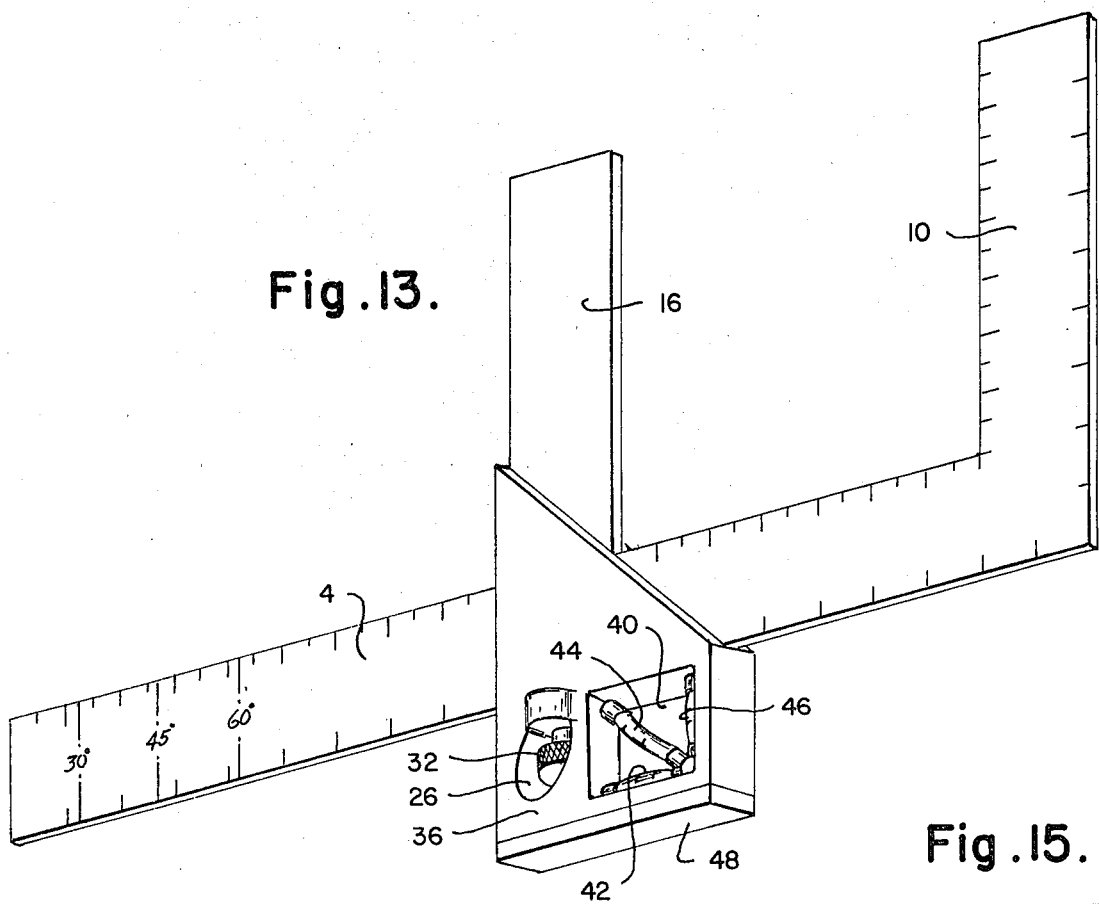
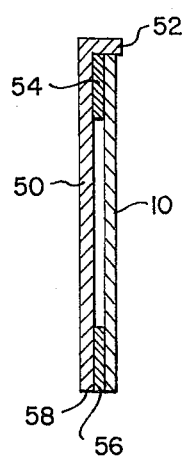
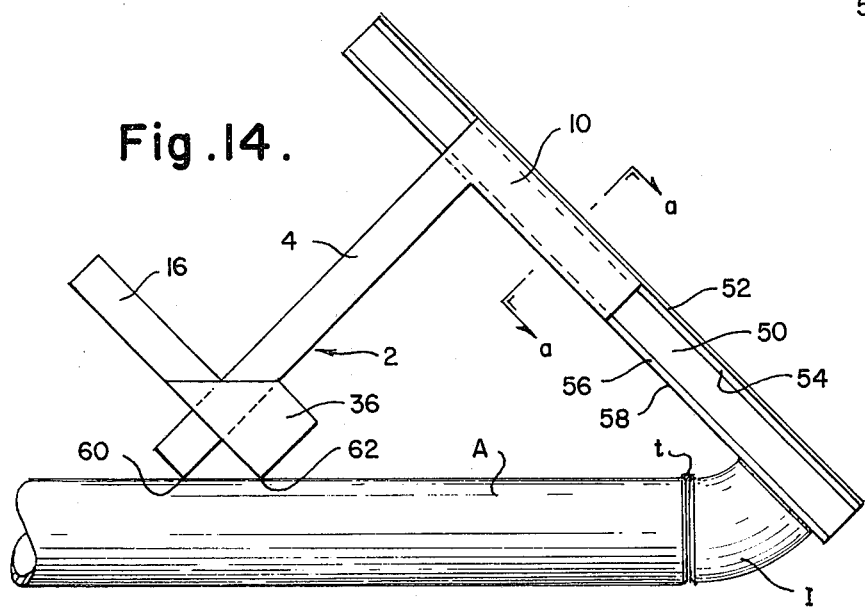

PIPE FITTER'S COMBINATION INSTRUMENT

BACKGROUND OF THE INVENTION

In the fabrication and installation of metal pipe and fittings of comparatively large diameter, the shear size and weight of the pipe lengths and the various transitional connections make it impractical to provide threaded ends which can be joined and sealed by rotation, as is common with relatively small diameter iron or steel pipes and fittings. It is therefore customary to position such pipe lengths and fittings successively in mating alignment and then apply annular weld beads to unitize the installation. In smaller pipe sizes it is often necessary to utilize a welding procedure to join the pipe components either because the material composition of the components is resistant to the provision of threaded ends which may be joined by rotation or because welding jointure requirements are dictated by the intended special use and are mandatory in the specifications for the installation.

The time required for preparing each jointure by pipe fitters in order to complete a predetermined layout is often tedious and cumbersome, particularly when the work is being performed insitu. The use of holding fixtures, as are normally available in a workshop environment, is not practical, and the careful positioning and temporary retention of each successive workpiece and the application of successive weld beads is a laborious process. It is common for at least two workmen to be involved in such pipe fitting practice. The steps they must perform for each jointure include positioning the workpieces by visual approximation, tack welding the workpieces along the intended line of jointure whereby some limited angular movement between the workpieces can still be effected, completing final accurate alignment of the work pieces relative to each other through the use of several large carpenter squares, and then applying an annular weld bead along the jointure line to firmly unitize and seal the joint. This procedure is repeated successively with the addition of each pipe length and fitting, and is particularly cumbersome because of the difficulties associated with manipulation of the squaring tools to properly position the workpieces.

The aforementioned fitting and welding procedure may be simplified and expedited through the provision and use of a specially designed locating and positioning instrument to replace the several carpenter's squares normally employed. A device for this purpose which has some obvious advantages to the pipe fitter has been previously disclosed in Canadian Pat. No. 697,863. There remains, however, a need for an improved, more versatile pipe fitter's instrument to expedite the weld jointure of diverse special purpose fittings in the arrangements which confront pipe fitters.

SUMMARY OF THE INVENTION

The present invention comprehends an improved combination instrument for use by a pipe fitter in various job-related applications but primarily as a tool for positioning and aligning pipe lengths and fittings prior to welding them into a unitized structure in accordance with a preconceived layout or plan.

The combination instrument of the present invention comprises a rigid squaring tool with an elongated straight-edged major bar portion and a fixed leg portion extending perpendicularly from one end of the major bar portion. The fixed leg also has parallel straight longitudinal edges therealong. A rigid auxiliary leg is adapted for slidable securement to the major bar portion in an orientation which is parallel to the fixed leg of the squaring tool. A carriage means arrangement attaches the distal end of the auxiliary leg to the major bar portion of the squaring tool whereby the auxiliary leg may be selectively slid and repositioned along the bar portion to adjust the distance between the adjustable leg and the fixed leg portion. The structure of the carriage means relative to the bar portion is such that it permits selective removal and reinstallation of the auxiliary leg in a reverse orientation wherein the auxiliary leg is moved from a first position of extension which is coextensive with the fixed leg portion, to a second position of extension from the opposite edge of the major bar portion, to facilitate use of the instrument relative to different positioning applications. A spacer block section is provided as an integral part of the carriage means and projects outwardly from the edge of the major bar portion of the squaring tool, at 180° to the auxiliary leg. The spacer block section serves as a means of properly locating the instrument in a spaced orientation from the side wall of a pipe length in certain pipe joining operations, and as a support base for the entire instrument in other operations. A manually operable releasable locking means is provided on the carriage means to retain the auxiliary leg in a predetermined position on the squaring tool.

In certain alternate embodiments of the invention, provision is made for magnetic holding means on the spacer block section whereby the instrument can be temporarily retained in a predetermined position on iron or steel pipe and thus free the hands of the pipe fitter. The invention also comprehends the provision of leveling means as an integral part of the instrument, and the provision of removable means of extending the effective length of the fixed leg portion of the squaring tool to thereby adapt the instrument for certain specialized uses.

BRIEF DESCRIPTION OF THE DRAWINGS

FIG. 1 is a perspective view of a basic embodiment of the present invention;

FIGS. 2 and 3 are perspective views of separable components of the instrument first shown in FIG. 1;

FIG. 4 is a partially cut away side elevational view of the component of the invention shown in FIG. 3;

FIG. 13 is a perspective view illustrating a more sophisticated embodiment of the instrument of the present invention as compared to the embodiment shown in FIG. 1;

FIG. 14 is a side elevational view of the invention first shown in FIG. 1 utilizing an additional component to enable use of the invention in a specific pipe fitting application; and FIG. 15 is a cross-sectional view taken along lines a—a of FIG. 14.

DETAILED DESCRIPTION OF THE PREFERRED EMBODIMENTS

Figure 7:
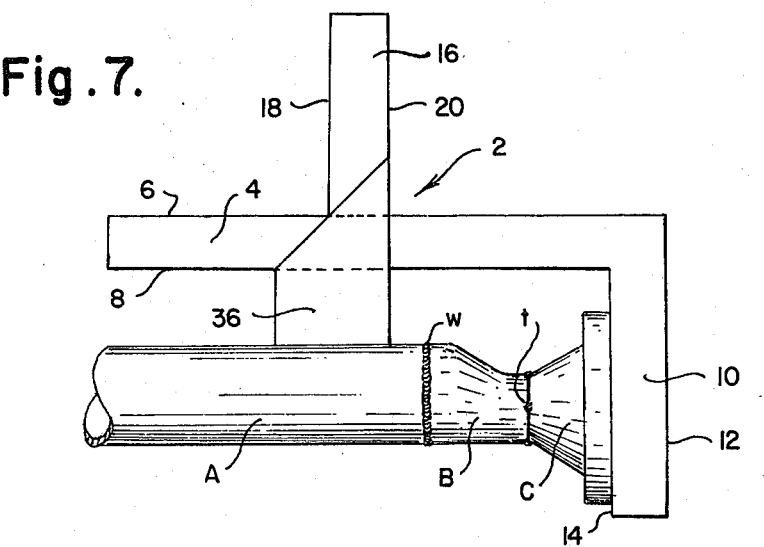
FIGS. 5 through 10 are respective side elevational views of the instrument first shown in FIG. 1, with each view illustrating a separate application or use of the instrument of this invention.

FIGS. 1 through 4 illustrate a pipefitter's combination instrument 2 comprising a rigid squaring tool (FIG. 2) having an elongated flat major bar portion 4 with straight oppositely disposed longitudinal marginal edges 6 and 8. Projecting from one end of the major bar portion 4 is a fixed leg portion 10 having oppositely disposed straight longitudinal edges 12 and 14. The edge 14 of the fixed leg portion 10 forms a 90° angle with the edge 8 of the major bar portion 4.

As shown in FIG. 1, an auxiliary leg 16 is mounted for slidable, longitudinal movement on the major bar portion 4. The auxiliary leg 16 is a rigid flat bar similar in configuration to the fixed leg 10, and has oppositely disposed longitudinal straight edges 18 and 20. The distal end of the auxiliary leg 16 is firmly anchored in a block 22 which serves as a carriage means to permit the auxiliary leg 16 to be slidably adjusted to any desired position along the length of the major bar portion 4.

As shown in FIG. 3, the block 22 may be formed from a solid piece which is provided with a groove or opening 24 and a transverse bore 26. As illustrated in FIG. 4, a relatively smaller bore or hole 28 extends from the sidewall defining bore 26 to the opening 24 and is threaded to accommodate a thumb screw 30 having a knurled head 32 contained within the bore 26. FIG. 4 also illustrates that the opening 24 is partially defined by the termination of the distal end of the auxiliary leg 16, and that the auxiliary leg 16 is firmly fastened in position to the block 22 by rivets 34.

It is preferred that all of the parts of the instrument heretofore described be formed from metal such as steel or aluminum so the instrument will withstand the wear and normal abuse which is normally encountered in the pipe-fitter's work environment. The major bar portion 4 and its fixed leg 10 constitute a squaring tool which may be stamped from metal stock of appropriate thickness. The auxiliary leg 16 may be similarly formed. The block 22 can be formed and machined from a solid piece, or alternatively, can be formed from stamped sidewall blanks laminated over a central blank to provide the configuration shown.

The opening 24 through the block 22 is appropriately dimensioned to accommodate the extension therethrough of the major bar portion 4 of the squaring tool in a reasonably snug slip-fit arrangement whereby the shank end of the thumb screw 30 will firmly engage against the adjacent straight longitudinal edge of the major bar portion 4, when the thumb screw is manually rotated. The described arrangement thus acts as a releaseable locking means to selectively fix the position of the adjustable leg 16 along the major bar portion 4.

When the adjustable auxiliary leg 16 is in its operative mounted position on the major bar portion 4, as shown in FIG. 1, the part of the block 22 wherein the set screw 30 is contained constitutes a spacer block section 36 having an outer end face 37 which is parallel to the longitudinal straight edge 6 of the major bar portion 4, as illustrated in FIG. 1. Specifically, the spacer block section 36 is that portion of the block 22 which, in FIG. 1, projects upwardly from edge 6 of major bar portion 4 and terminates in the flat end face or base 37. The spacer block section 36 has oppositely disposed side faces 38 and 39, each of which forms a right angle relative to the edge 6 of the major bar portion 4.

Figure 5:
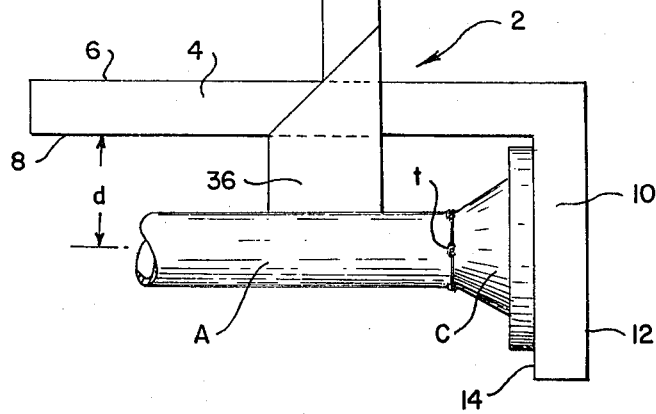

The embodiment of the invention shown in FIGS. 1-4 is designed and intended for use by a pipefitter in various pipefitting applications. One such application is shown in FIG. 5 which illustrates the disposition of the instrument 2 and the orientation of its parts to effect a connection between a pipe length A and a neck flange fitting C. In understanding FIG. 5 it should be assumed that pipe length A has been previously installed in a permanent fixed intended position, and that the instrument 2 is being utilized to properly locate the neck flange C for coaxial connection to the end of the pipe length A. The connecting procedure includes the steps of placing the neck flange C with its narrow lip against the end rim of the pipe length A, placing one or more spaced apart tack welds on the annular line of abutment between the pipe length A and the neck flange C, disposing the auxiliary leg 16 in the general disposition shown in FIG. 5 whereby the spacer block section 36 projects from the inside straight edge 8 of the major bar portion 4, and utilizing the inside edge 14 of the fixed leg 10 to "square" the wide-faced end of the neck flange C with the sidewall of the pipe length A.

It should be noted that the linear dimension of the spacer block section 36 taken from the pipe A sidewall to the edge 8 of the major bar portion 4 must be of a specific minimum magnitude. It is essential that the distance "d" shown by the arrows in FIG. 5, be at least equal to and preferably slightly greater than the widest radius of any part of any fitting normally used with a given size of pipe. Accordingly, the height dimension "h" of the spacer block section 36 (see FIG. 4) must be at least equal and preferably greater than the difference obtained by subtracting the radius of pipe A from the radius taken at the widest point of the widest normal fitting. The widest normal fitting generally would be the widest common transitional neck flange used with any pipe size. Having established the critical range for the dimension "h", it should then be recognized that the length of the inside edge 14 of the fixed leg 10 must at least equal to the diameter of the neck flange C taken along its wide forward face, plus the linear distance from edge 8 of the bar portion 4 to the nearest circumferential surface of neck flange C. This assures full face contact of the edge 14 of the fixed leg 10 in properly aligning the neck flange C to pipe length A following the tack welding step and prior to completion of the annular bead weld which permanently joins neck flange C to pipe length A.

Figure 6:
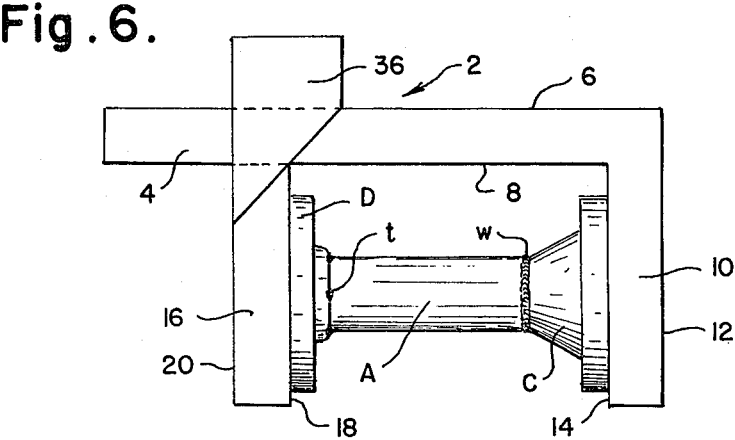

FIG. 6 demonstrates the use of the instrument of the present invention wwherein the pipe length A is a relatively short nipple, and the neck flange C has already been welded permanently into position pursuant to the arrangement shown in FIG. 5. Where, as shown in FIG. 6, it is desired to place a slip flange D (or any other fitting having oppossite end parallel bases which are perpendicular to the axis of the fitting) on a pipe nipple A and at a position a relatively short distance from an already installed fitting such as neck flange C, the components of the instrument 2 are oriented as shown in FIG. 6 whereby the auxiliary leg 16 is coextensive with the fixed leg 10. The installation steps include visually aligning the slip flange D in its intended position and retaining it there by one or more tack welds and then placing the instrument 2 into position with the inner edge 14 of the fixed leg 10 firmly against the base of the neck flange C. Then, the auxiliary leg 16 is adjustably moved along the major bar portion 4 whereby its inward edge 18 abuts with the wide face of the slip flange D. Slight manual repositioning of the slip flange D relative to the pipe length may then be accomplished as the instrument 2 is rotatively repositioned about the pipe-fitting assembly to several successively different planes in order to obtain true coaxial orientation of the slip flange with the pipe. This use of the tool in FIG. 6 aptly demonstrates a need, not previously mentioned herein, for the length of the auxiliary leg 16 to be the same, along its edge 18, as the length of the fixed leg 10 along it inside edge 14. Then, when the instrument 2 is used in an orientation similar to that illustrated in FIG. 6, large diameter fittings can be successively aligned and welded when they are in close proximity to each other.

FIG. 7 demonstrates the use of the instrument 2 in an operation to connect two successive fittings, one to the pipe A and one to the first connected fitting. Specifically, FIG. 7 shows an eccentric reducer B after bead weld "w" has been applied to permanently join the large end of the reducer B to the end of the pipe length A. A neck flange C has been tack welded into position for final alignment, through the use of the instrument 2, prior to the application of an annular weld bead at the abutment line between the two fittings B and C. In the performance of the steps required to obtain the pipe component arrangement shown in FIG. 7, the instrument 2 was utilized first to properly align the eccentric reducer B. In the use of the instrument for such an alignment, the spacer block section 36 would have been located relative to the fixed leg 10 approximately the same as the distance shown in FIG. 5, after which it would be manually adjusted a greater distance along the major bar portion 4 to the position shown in FIG. 7 for use in positioning the neck flange C.

Figure 8:
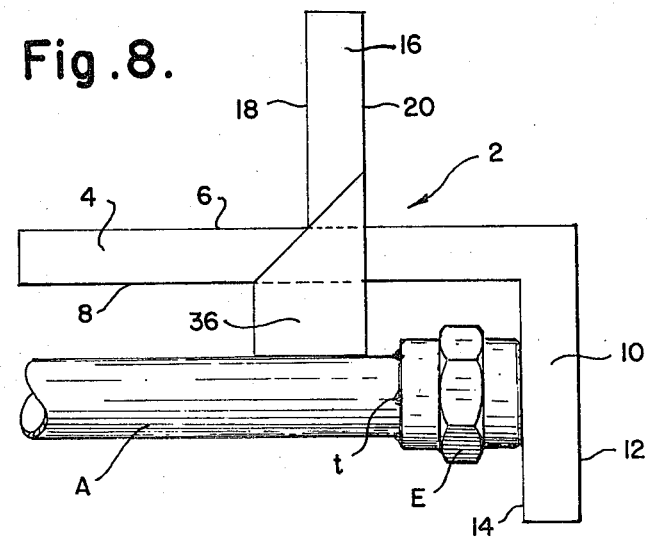

FIG. 8 illustrates the use of the instrument 2 in positioning a three part union E for welding to the end of the pipe length A. The connection between the pipe length A and the union E could be made, with the use of the instrument 2, by using only that part of the union which is actually connected to the end of the pipe length A and thereafter assembling the union to continue the installation. FIG. 8, however, shows the use of the instrument 2 as it is employed for positioning the assembled union E. Such use is effective so long as the parts of the union are substantially firmly joined by rotating of the central section of the union into firm threaded position so that the outer face of the union will occupy a plane which is perpendicular to the axis of the union. Then, when the instrument 2 is used for aligning the union relative to the pipe length A, prior to application of the final weld bead, coaxial alignment of the union E to the pipe length A is assured.

Figure 9:
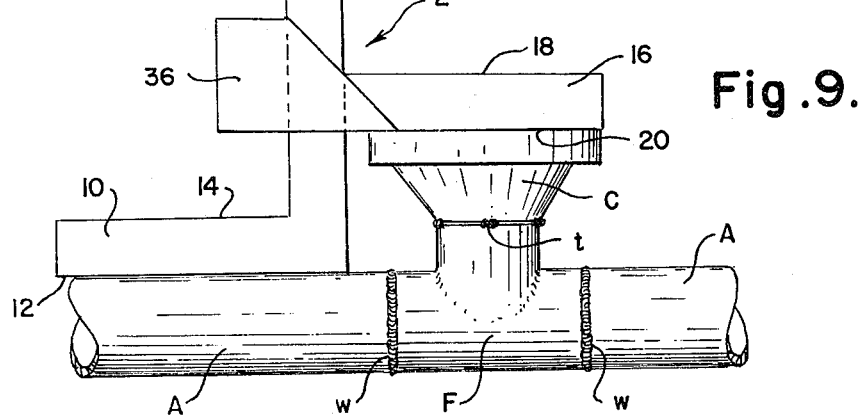

FIG. 9 illustrates the use of the instrument 2, with its components oriented substantially the same as in FIG. 8, for aligning a neck flange C into an aligned position on the laterally projecting lip of a tee connection F. The tee F has already been aligned and permanently welded in an interposed position between two pipe lengths A. In this illustration, the instrument 2 serves to align the wide face end of the neck flange C into parallel orientation with the side wall surface of pipe length A.

Figure 10:
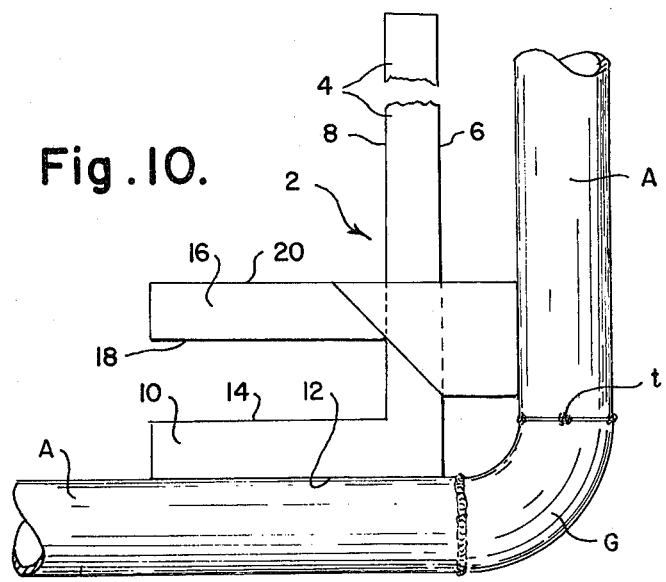

FIG. 10 illustrates the use of the instrument 2 as a means of aligning successive pipe lengths A in an exact right angle orientation with each other. In the arrangement shown in FIG. 10, assuming the horizontal pipe length A is the fixed stationary member prior to the permanent coupling thereto of the elbow G, the instrument 2 would be utilized in the manner and orientation shown in FIG. 9 to align the elbow G to the horizontal pipe length A. Then, once the annualar weld bead is applied to permanently join the elbow G into position to the horizontal pipe length A, the components of the instrument 2 would be rearranged to the orientation shown in FIG. 10 to enable the alignment of vertical pipe length A with horizontal pipe length A, as shown.

Figure 11:
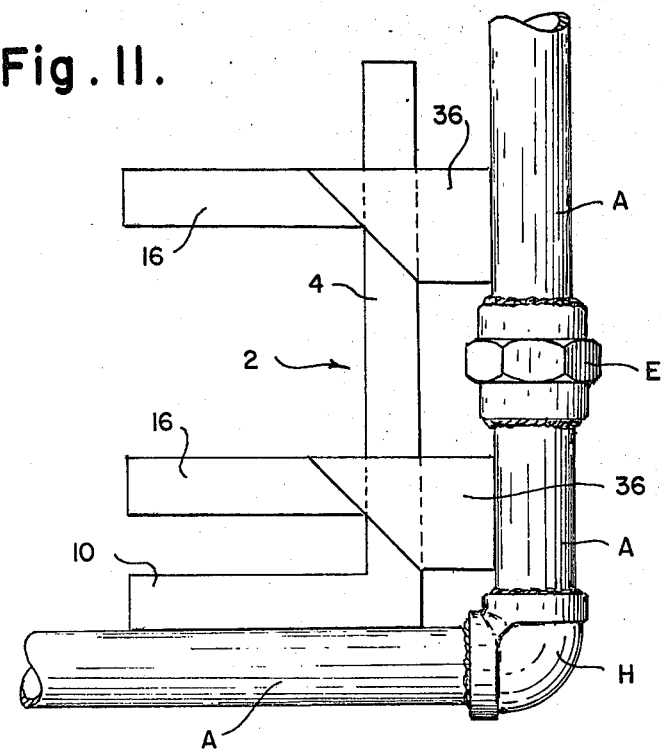
FIG. 11 is an elevational view of an alternate embodiment of the present invention, illustrating its use in achieving a specific pipe fitting arrangement.

FIG. 11 illustrates an alternate embodiment of the present invention wherein the instrument 2 utilizes a pair of spacer block sections 36 to effectively bridge a union E in aligning two vertically successive pipe lengths A with the union E interposed therebetween. Obviously, the instrument 2 could be utilized with a single spacer block section 36 if the pipe fitter elected to fully complete each jointure from the elbow H upwardly, before proceeding with the next upwardly sucessive connection. However, provision of the addiitional spacer block section 36 enables the entire vertical portion of the pipe assembly to be tack welded and then permanently aligned before applying any of the full annular weld beads to render the assembly permanent.

Figure 12:
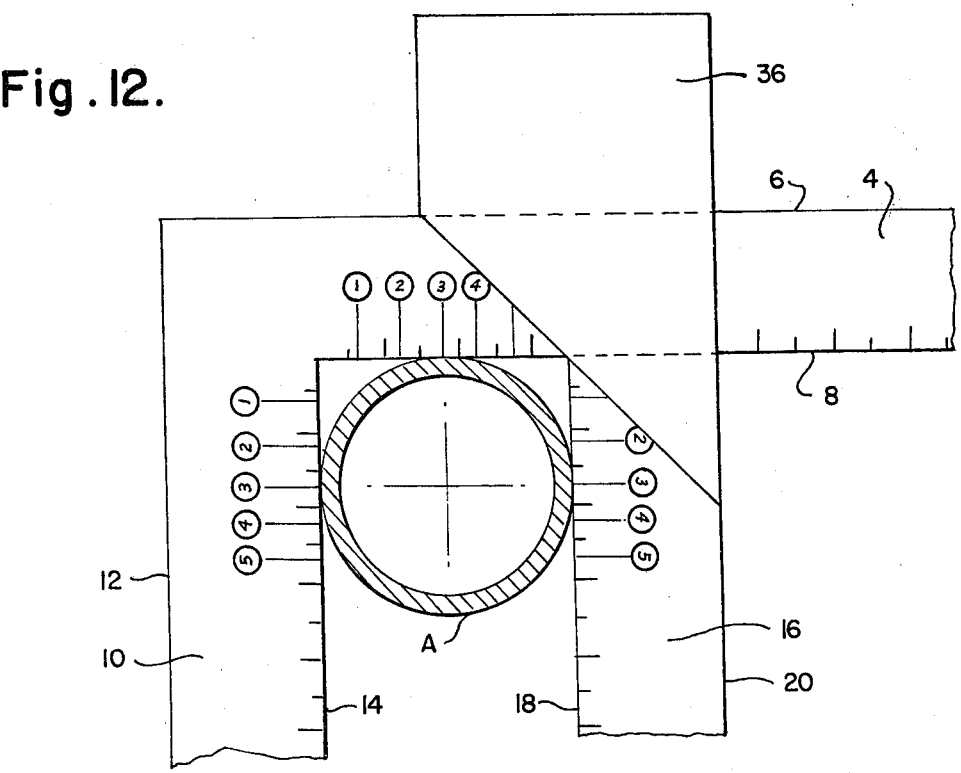
FIG. 12 is an elevational view of the instrument first shown in FIG. 1, with portions thereof cut away, and illustrating a special use of the tool to accomplish a particular layout function.

The instrument 2 is preferably provided with calibrated scale indicia such as shown along the inside margins of the major bar portion 4, the fixed leg 10, and the auxiliary leg 16, in FIG. 12. These calibrated markings serve several different functions. For example, the number of typical different types of pipe fittings is limited, as is the number of different common pipe sizes. Therefore, most pipe fitting situations or arrangements are repetitive such that the pipe fitter, in using the instrument 2, will quickly begin to associate and memorize certain pipe fitting operations with the required component orientation and specific adjustment setting of the instrument 2. By use of the calibrated scale the pipe fitter may quickly position the auxiliary leg 16 at a desired point along the edge 8 of the major bar portion 4 to obtain a setting which is commensurate with aligning a particular fitting arrangement.

This invention also contemplates the provision of a specific special-purpose scale along the inside edges of the major bar portion 4, the fixed portion 10, and also along the inward edge 18 of the auxiliary leg 16. The numbers set forth on the instrument in FIG. 12 which appear in circles coincide with the radius of standard pipe sizes whereby use of the instrument 2, as shown, in a "caliper" orientation about any given pipe length, enables the pipe fitter to accurately segment the pipe surface into quadrants. The ability to lay out such quarter markings is important to the pipe fitter when, for example, it is desired to make a saddle-type connection along the length of a pipe without the use of a fitting. This involves cutting a "fish mouth" opening in the pipe side wall, and a complimentary shape on the pipe end to be welded thereto. Such an opening is made by first inscribing a pattern for the cut line which can only be done if the pipe fitter first has specific reference points on the pipe surface from which to begin. Such reference points are provided by locating circumferentially spaced marks about the pipe in an annular arrangement which can be accomplished by the means shown in FIG. 12.

The primary purpose of the instrument 2, as heretofore described in various operations, is to facilitate angular alignment of successive pipe lengths and fittings. A distinct advantage in obtaining such angular alignment between a fixed or stationary pipe length and a successive pipe length or fitting to be coupled thereto is that force or pressure of the instrument to hold it in proper position during use is only against the stationary workpiece and then only through contact of one component of the instrument with the stationary workpiece. This obviates the need, as required in prior art methods of alignment, of being certain that more than one component or point of an alignment tool is in abutting contact with the surface of the stationary workpiece. In every common connecting operation, either the spacer block section 36 or the fixed leg portion 10 or the auxiliary leg 16 is firmly held against the surface of the stationary workpiece whereby the workpieces to be connected to the stationary workpiece can be moved into alignment with the other guiding surfaces of the instrument 2. Accordingly, in most instances of its use, the instrument 2 is held stationary against a stationary workpiece so that no force need be asserted against the next successive fitting or pipe length brought into position for connection.

The form of the instrument 2 as heretofore described may be further sophisticated in its manufacture to enhance its versatility for the pipe fitter. A more sophisticated embodiment of the instrument 2 is shown in FIG. 13 wherein a large opening 40 is provided through the spacer block section 36 to facilitate the installation therein of level means which is preferably a plurality of spirit levels 42, 44, and 46. Level 42 is installed to extend parallel to the end surface of spacer block section 36. Level 46 is installed to extend exactly perpendicular to level 42. Level 44 is installed to extend at 45° to level 42. The aforementioned arrangement enables the pipe fitter to visually ascertain the position of any pipe length, during installation, relative to true horizontal or vertical and make appropriate adjustments as required. In any use of the tool herein described, one of the levels 42, 44, or 46 will be oriented to serve as a means for the pipe fitter to visually check either the horizontal or vertical positioning of a pipe workpiece.

FIG. 13 also illustrates a further sophistication of the instrument 2 which is the provision, on the outer end surface of spacer block section 36, of a rectangular permanent magnet 48. Inasmuch as a significant number of the typical installation arrangements encountered by the pipe fitter are those wherein a spacer block section is in contact with a pipe length (see, for example, FIGS. 5, 7, and 8), the instrument 2 can be rendered self supporting through the attraction of the magnet 48 to the pipe length surface. Accordingly, the provision of the magnet 48 permanently fixed to the outer end surface of the spacer block section 36 provides a further useful characteristic to the instrument 2, particularly in the installation of common iron or steel pipe lengths or fittings.

Most pipe installations require either 90° or 180° orientation of successive workpieces. That is, most connection operations involve placing the next fitting on a pipe length whereby the successive pipe length to be installed after installation of the fitting will extend coaxial to the stationary pipe length in a 180° orientation, or perpendicular to the axis of the stationary pipe length in a 90° orientation. Fewer in number are those connections which require orientation of a successive pipe length at some other angle such as 45° or 30° to the preceding stationary pipe length. When special angle orientations are required, an additional longitudinal plate or edge extender 50 is used as part of the combination of the instrument 2, as shown in FIG. 14. The edge extender 50 is a rigid elongated bar similar to a long straight edge. The edge extender 50 preferably has a longitudinally extending integral skirt portion or ridge 52 which defines one of the long edges of the extender 50. The use of the extender 50 may be further facilitated by the provision of resilient plastic magnetic strips 54 and 56 extending longitudinally on one flat surface of the extended 50, in a spaced apart relation whereby the strip 54 is adjacent the under surface of the ridge 52, and the strip 56 extends along the straight edge 58 of the extended 50, as shown in FIG. 15.

The components of the instrument 2, as shown in FIG. 14, are utilized to align fittings, such as 30° and 45° elbows, to a pipe lengt, prior to completion of the permanent weld operation. Proper orientation of the instrument 2 is obtained by presetting the long side edge of the carriage means to align it with the 45° mark on the major bar portion 4. The adjacent corners 60 and 62 of the major bar portion and the spacer block section, respectively, become a base which, when in contact with the pipe length, dispose the edge 14 of the fixed leg portion 10 at the appropriate selected angle relative to the axis of the pipe length. The extender 50 is then placed in position on the fixed leg 10 whereby its edge 58 coincides with edge 14 of fixed leg portion 10 and serves as an accurate linear extension against which to align the outer face of the 45° elbow I shown in FIG. 14. The ridge 52 of extender 50 enables rapid firm contact and alignment of the extender 50 with the fixed leg portion 10, and the magnetic strips 54 and 56 serve to hold the extender in position during use. Obviously, for use of the magnetic strips 54 and 56, it is necessary that the instrument 2 be of an iron or steel composition to enable the magnetic attraction and temporary holding of the extender 50 in position on the fixed leg portion 10. Alternatively, the magnetic strips 54 and 56 could be eliminated in favor of embedded discrete magnets spaced along the body of the extender 50. Such modification would better withstand the conditions and normal abuse to which the instrument 2 will be subjected. It is also contemplated that the entire extender 50 could be a magnetized bar to enable it to be temporarily magnetically locked into position against the fixed leg portion 10.

While certain presently preferred forms of the invention have been heretofore described and shown, other equivalent variations may occur to thos skilled in the art in light of the above teachings. It should be understood that the appended claims are intended to cover all such variations coming within the spirit and scope of the present invention.

I claim:

1. An adjustable instrument adapted for use by a pipefitter for positioning and weld joining pipe lengths with a variation of respectively different common fittings, comprising:

a rigid squaring tool having an elongated major bar portion with coextensive first and second straight edges and with a fixed leg portion extending from an end of the bar portion and at a right angle to the first straight edge of the major bar portion and in coplanar orientation to the bar portion, a carriage means slidably secured to the bar portion, a rigid adjustable leg slidably secured to the carriage means in a first position of extension thereon such that the adjustable leg extends transversely from the first straight edge of the bar portion and coextensive and parallel to the fixed leg portion, the carriage means including inwardly-contained manually-releasable locking means permitting the adjustable leg to be selectively slid along the bar portion to adjust the distance between it and the fixed leg portion, the carriage means being adapted to permit selective removal and reinstallation of the adjustable leg on the bar portion, from the first position of extension to a second position of extension wherein the adjustable leg extends from the second straight edge of the bar portion which is opposite to the first straight edge from which it projected in the first position of extension, a spacer block section integral to the carriage means and extending, when the rigid adjustable leg is in its first position of extension, from the second straight edge of the bar portion a distance of not less than the difference between the radius of any typical pipe length and the radius taken at the widest point of the widest standard fitting for such typical pipe length, and the spacer block section having an outer end unemcumbered face which is parallel to the straight edge of the major bar portion, said end face engaging the pipe length when the rigid adjustable leg is in its second position of extension.

2. The instrument of claim 1 wherein the locking means is disposed on the spacer block section.

3. The instrument of claim 1 wherein the locking means includes a first bore extending through the spacer block section, a second bore extending from the first bore to the opening, and means for selectively causing a binding engagement through the second bore and against the edge of the major bar portion to prevent the carriage means from sliding from a preselected position on the major bar portion.

4. The instrument of claim 3 wherein the second bore is defined by threads cut into the spacer block section, and further including a threaded screw extending through the second bore and threadably-engaged therein to be manually rotated to lock the carriage means and thereby prevent its sliding movement on the major bar portion.

5. The instrument of claim 1 wherein the spacer block section has an outer end face constituting a permanent magnet.

6. The instrument of claim 1 further comprising leveling means mounted on the spacer block section.

7. The instrument of claim 6 wherein the leveling means includes a plurality of separate spirit levels oriented in relatively different planes.

8. The instrument of claim 6 wherein a bore extends through the spacer block section, and the leveling means is mounted within the bore.

9. The instrument of claim 1 further including a second rigid adjustable leg slidable secured to the major bar portion and adapted to extend therefrom in parallel relation to the first adjustable leg.

10. The instrument of claim 1 wherein at least one side surface of the major bar portion and the fixed leg portion are provided with visually-ascertainable graduations thereon to expedite the pipefitter's adjustment of the instrument during use.

11. The instrument of claim 10 wherein the visually-ascertainable graduations are provided at least along the edge of the fixed leg portion disposed toward the major bar portion and along the edge of the major bar portion disposed toward the fixed leg portion, and equivalent graduations are provided along one edge of the adjustable leg portion.

12. The instrument of claim 1 further comprising extension means for selectively providing an extension of a longitudinal edge of the fixed leg portion.

13. The instrument of claim 12 wherein the extension means is a flat rectangular elongated plate with means thereon acting to temporarily retain the plate in side-to-side abuttment with the rigid leg portion.

14. The instrument of claim 13 wherein the temporary retaining means is magnetic means.

15. The instrument of claim 13 wherein the plate has guide means thereon enabling automatic manual adjustment of one long edge of the plate with a corresponding edge of the fixed leg portion.

16. The instrument of claim 15 wherein the guide means comprises a ridge projecting along a longitudinal edge of the plate and forming an angle with the flat surface of the plate.

17. The instrument of claim 1 wherein an opening is defined between the spacer block section and the distal end of the adjustable leg, and the opening is adapted to slidably receive the major bar portion therethrough.

* * * * *